S. H. RAYMOND.
BOW FOR VEHICLE TOPS.
No. 10,422. Reissued Dec. 11, 1883.
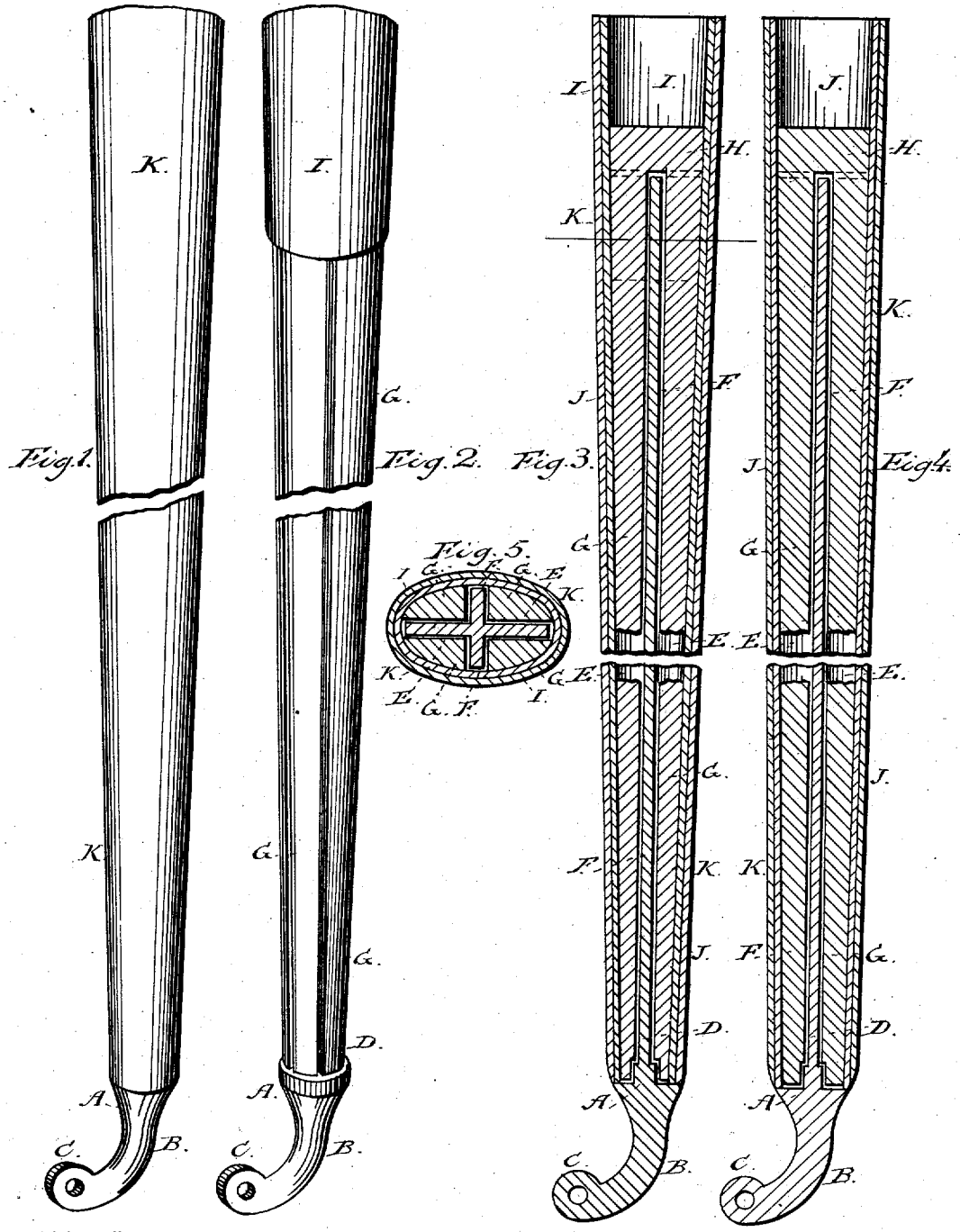
Attest;
W. H. Howard
J. E. Blackwood
Inventor;
Silas H. Raymond,
by W. H. Doolittle
Attorney.
N. PETERS, Photo-Lithographer, Washington, D. C.

UNITED STATES PATENT OFFICE.

SILAS H. RAYMOND, OF GRAND RAPIDS, MICHIGAN.

BOW FOR VEHICLE-TOPS.

SPECIFICATION forming part of Reissued Letters Patent No. 10,422, dated December 11, 1883.

Original No. 279,016, dated June 5, 1883. Application for reissue filed September 27, 1883.

*To all whom it may concern:*

Be it known that I, SILAS H. RAYMOND, a citizen of the United States, residing at Grand Rapids, in the county of Kent and State of Michigan, have invented certain new and useful Improvements in Bows for Vehicle-Tops; and I do hereby declare the following to be a full, clear, and exact description of the invention, such as will enable others skilled in the art to which it appertains to make and use the same, reference being had to the accompanying drawings, which form a part of this specification, and in which—

Figure 1 is a perspective view of my improved bow for vehicle-tops, finished. Fig. 2 is a similar view of the same without the covering. Fig. 3 is a longitudinal sectional view of the finished bow. Fig. 4 is a similar view of a slight modification of the same, and Fig. 5 is a cross-section of the bow.

Similar letters of reference indicate corresponding parts in all the figures.

My invention has relation to bows for vehicle-tops; and it consists in the improved construction and combination of parts of the same, as hereinafter more fully described and claimed.

In the accompanying drawings, the letter A indicates the slat-iron, which consists of the lower curved portion, B, forming the eye C, by which it is pivoted upon the bow-iron, and the upper portion, D, which consists of a flat bar, E, having two flat ribs or webs, F, extending longitudinally at right angles to both sides from its central line, making it cross-shaped in section. The bar E is preferably wider than the two ribs, F, and the spaces between the bar and the ribs are filled by four strips of wood, G, fitting into the rectangular spaces, rounded upon their outer sides, forming an oval or ellipse in cross-section, and made by cutting a tapering wooden bar or stick of the required shape longitudinally and at right angles to the length of the slat-iron, the upper end, H, remaining solid, the ribs of the slat-iron fitting into the kerfs thus cut. By constructing the slats or straight portions of the carriage-bow with this ribbed iron or steel core, great strength is obtained, combined with comparative lightness of material, the four ribs strengthening the slat against bending or breaking from all sides.

To prevent the upper end, H, of the wooden portion of the slat from splitting, and to form a socket for the reception of the downward-bent ends of the upper portion of the bow, a sheet-metal ferrule, I, tapering at its lower end to correspond in shape with the shape of the slat, is placed over the same, whereupon the entire slat is covered with a layer, J, of veneering, which again is covered with a layer, K, of paper or other suitable material, whereupon the whole is finished.

If desired, the metallic ferrule may be dispensed with, the veneer covering having sufficient strength to form the socket or the upper portion of the bow.

It will be seen that by this construction of the bow-slat great strength is obtained by the ribbed slat-iron, and that likewise the veneer covering firmly glued together will make a very strong covering for the slat, the grain in the different layers of veneering crossing, or, at all events, running in different directions, by being laid around the tapering slat. The entire slat may be made of layers of veneering rolled up to form a narrow tube, into which the slat-iron may be inserted and cemented together, forming a socket at the upper end, thus doing entirely away with wooden filling.

I consider the incasement of a carriage-bow with veneering to be the main feature of my invention.

Having thus described my invention, I claim and desire to secure by Letters Patent of the United States—

1. In a slat for carriage-bows, the combination of the slat-iron, an inner wooden core, and a covering of veneering incasing the said wooden core, substantially as described.

2. A slat for carriage-bows, consisting of a wooden core fastened upon the slat-iron, and having a covering of veneer and a finishing covering, K, as and for the purpose shown and described.

3. A slat for carriage-bows, consisting of a wooden core fastened upon the slat-iron, and having a metallic socket or ferrule at its upper end, a covering of veneer, and a finishing cover, K, as and for the purpose shown and set forth.

In testimony whereof I affix my signature in presence of two witnesses.

SILAS H. RAYMOND.

Witnesses:

ARTHUR C. DENISON,
FRED W. STEVENS.